United States Patent [19]

Satou et al.

[11] Patent Number: 4,893,149

[45] Date of Patent: Jan. 9, 1990

[54] PHOTOGRAPHIC PRINTING APPARATUS

[75] Inventors: Hiroyuki Satou; Junichi Tsuji, both of Kanagawa, Japan

[73] Assignee: Fuji Photo Film Co., Ltd., Kanagawa, Japan

[21] Appl. No.: 299,096

[22] Filed: Jan. 19, 1989

[30] Foreign Application Priority Data

Jan. 20, 1988 [JP] Japan .................................. 63-10382

[51] Int. Cl.⁴ ........................ G03B 27/54; G03B 27/72
[52] U.S. Cl. ............................................ 355/67; 355/71
[58] Field of Search ..................................... 355/67, 71

[56] References Cited

U.S. PATENT DOCUMENTS 1,097,211 5/1914 Bechstein .............................. 355/67
3,684,371 8/1972 Weisglass et al. .................... 355/71
3,914,721 10/1975 Pollock ................................. 355/71

Primary Examiner—L. T. Hix
Assistant Examiner—D. Rutledge
Attorney, Agent, or Firm—Sughrue, Mion, Zinn, Macpeak & Seas

[57] ABSTRACT

A photographic printing apparatus for diffusing light emitted from a light source and irradiating a negative film with the light diffused has a body for accommodating a light source, a case which is attached to the accommodating body for swinging motion between an exposure-light guiding position and an out-of-optical-path position, and a diffuser box which is detachably attached to the case. With this arrangement, when a diffuser box is to be replaced in order to employ a negative film of different size, the diffuser box can be mounted without the need to detach the case.

18 Claims, 3 Drawing Sheets

4,893,149

PHOTOGRAPHIC PRINTING APPARATUS

BACKGROUND OF THE INVENTION

1. Field of the Invention

The present invention relates to a photographic printing apparatus arranged to diffuse light emitted from a light source and irradiate a negative film with the light diffused.

2. Description of the Related Art

In such a photographic printing apparatus for printing an image on photographic paper, a diffuser box accommodated in a case is disposed between a negative film carrier and a light source, and an image to be printed is formed on photographic paper by diffusing light emitted from the light source in the diffuser box, irradiating a negative film with the thus-diffused light, and exposing the photographic paper to the light transmitted through the negative film.

In this kind of diffuser box, the internal diameter of a light diffusing portion is determined in accordance with the size of each kind of negative film and, each time a negative film of different size is to be employed, it is necessary to replace the diffuser box by a different kind of diffuser box which corresponds to the size of the negative film. To cope with such necessity, in a conventional type of apparatus, the case is detachably attached so that the diffuser box together with the case may be replaced when a negative film of different size is t be employed.

In this case, however, it is necessary to prepare a multiplicity of cases for accommodating diffuser boxes of many kinds each having a light diffusing portion of different size.

SUMMARY OF THE INVENTION

It is, therefore, an object of the present invention to provide a photographic printing apparatus of the type in which it is unnecessary to prepare a multiplicity of cases for accommodating a diffuser box.

To achieve the above object, in accordance with the present invention, there is provided a photographic printing apparatus for diffusing light emitted from a light source and irradiating a negative film with the light diffused. The apparatus has a body for accommodating a light source, a case which is attached to the accommodating body for swinging or rotary motion between an exposure-light guiding position and an out-of-optical-path position, and a diffuser box which is detachably attached to the case.

In accordance with the present invention which provides the above-described arrangement, when the case is rotated to the out-of-optical-path position, attachment and detachment of the diffuser box is enabled. If a negative film of different size is to be employed, the diffuser box can be replaced without the need to detach the case.

In addition, since various kinds of diffuser boxes each having a different inner diameter are formed to have an identical outer diameter or external configuration, it is possible to selectively mount diffuser boxes of different size with ease.

DESCRIPTION OF THE PREFERRED EMBODIMENTS

Figure 1:
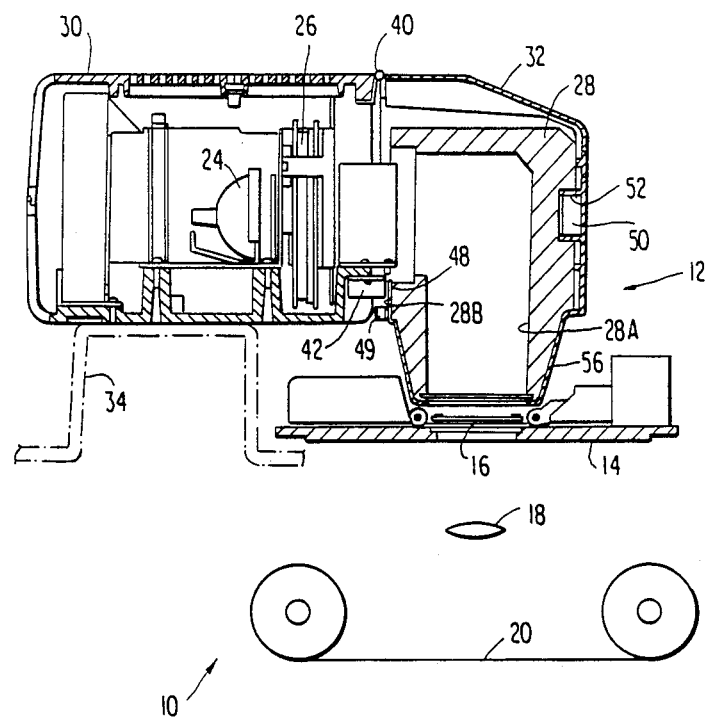
FIG. 1 is a cross-sectional view diagrammatically showing the structure of a photographic printing apparatus to which the present invention is applied.
Figure 2:
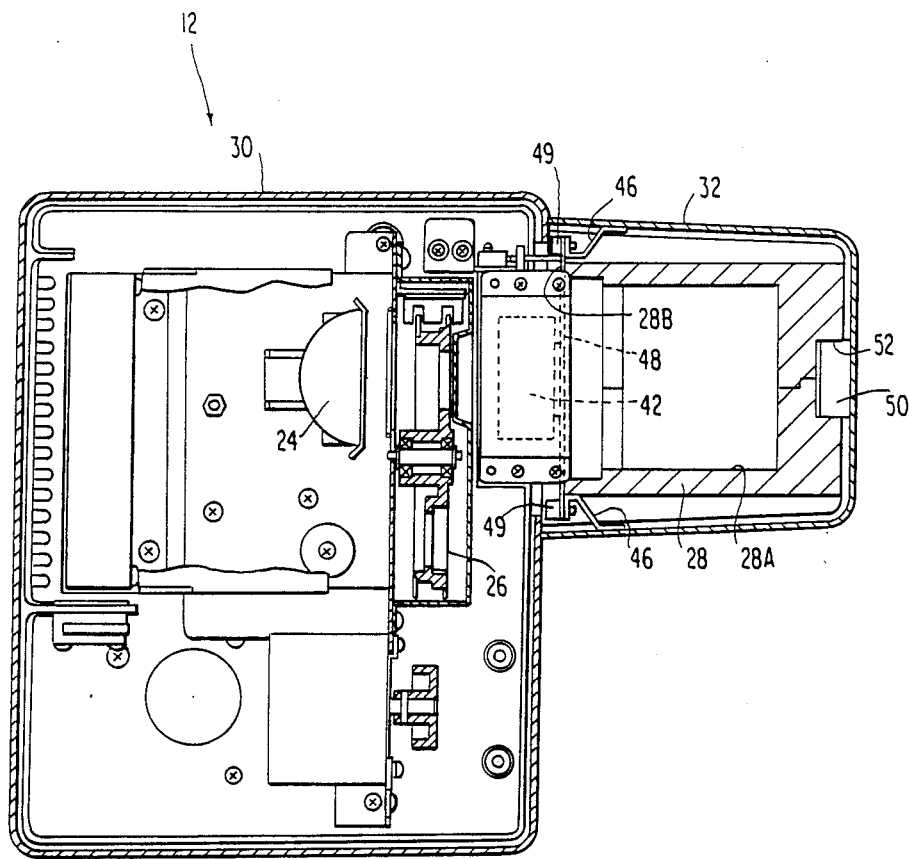
FIG. 2 is a plan view showing in cross section the structure of the apparatus of FIG. 1.
Figure 3:
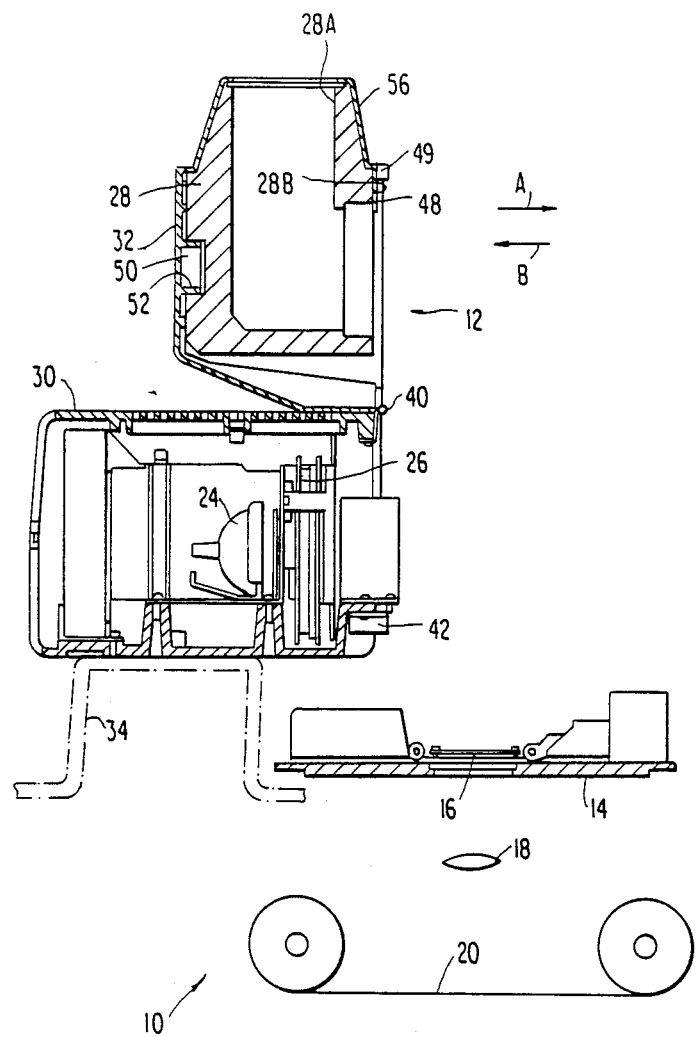
FIG. 3 is a view similar to FIG. 1, and serves to illustrate the operation of the movable case shown in FIG. 1.

FIGS. 1 to 3 show a photographic printing apparatus 10 to which the present invention is applied.

As shown in FIG. 1, in the photographic printing apparatus 10, light emitted from a light source section 12 irradiates a negative film 16 carried by a carrier 14, and the light transmitted through the negative film 16 exposes photographic paper 20 through a lens unit 18, thereby forming an image to be printed on the photographic paper 20.

The light source section 12 has a shell constituted by a fixed case 30 and a movable case 32. A light source 24 and a filter 26 are mounted in the fixed case 30, while a diffuser box 28 made of foamed polystyrol is mounted in the movable case 32. Light emitted from the light source 24 is passed through the filter 26, diffused in the diffuser box 28, and irradiated onto the negative film 16. The diffuser box 28 has a light diffusing portion 28A whose size is determined in accordance with the size of the negative film 16. If a negative film of different size is to be used in place of the negative film 16, a diffuser box having a size corresponding to that of the negative film can be employed as the diffuser box 28.

The fixed case 30 is fixed to a frame 34 by machine screws (not shown), and a hinge 40 and a magnet 42 are attached to the fixed case 30 on the side downstream of an optical path (on the right-hand side in FIG. 1) so as to enable attachment of the movable case 32.

The movable case 32 is attached to the hinge 40 on the side upstream of the optical path so that it can be rotated about the hinge 40 through approximately 180 degrees from the exposure-light guiding position shown in FIG. 1 in the counterclockwise direction as shown in FIG. 3. A magnetically attractable iron strip 48 is attached to the movable case 32 via brackets 46 (which are shown in FIG. 2) on the side upstream of the optical path. Since the aforesaid magnet 42 attracts the magnetically attractable iron strip 48 at the exposure-light guiding position, accidental rotation of the movable case 32 about the hinge 40 is prevented by the attraction of the magnet 42. The magnetically attractable iron strip 48 is attached to the brackets 46 by machine screws 49. When the movable case 32 is rotated through approximately 180 degrees in the counterclockwise direction in FIG. 1 from the exposure-light guiding position of FIG. 1 to an out-of-optical-path position (the position shown in FIG. 3), attachment and detachment of the magnetically attractable iron strip 48 is enabled.

A positioning projection 50 is formed on the inner wall of the movable case 32 which opposes the light source 24 so as to cooperate with the magnetically attractable iron strip 48 to enable attachment and detachment of the diffuser box 28.

More specifically, the diffuser box 28 has a recess 52 which is formed at a location corresponding to the positioning projection 50. In a state wherein the positioning projection 50 is inserted in the recess 52, the position of the diffuser box 28 does not shift in any direction other than the upstream direction of the optical path (the leftward direction in FIG. 1). Since an end portion 28B on the upstream side of the optical path is maintained in contact with the magnetically attractable iron strip 48, the position of the diffuser box 28 does not shift in the upstream direction of the optical path. If the movable case 32 is rotated counterclockwise through approximately 180 degrees from the exposure-light guiding position shown in FIG. 1 to the out-of-optical-path position shown in FIG. 3 and the magnetically attractable iron strip 48 is detached, the diffuser box 28 can be removed by extracting it in the direction indicated by an arrow A in FIG. 3. If the diffuser box 28 thus removed is moved, as by pushing, in the direction indicated by an arrow B in FIG. 3 and the magnetically attractable iron strip 48 is then attached, the diffuser box 28 can again be attached as shown in FIG. 3.

Although the diffuser box 28 has a projecting portion which partially projects from the movable case 32 in the direction downstream of the optical path (downwardly in FIG. 1), a light shielding cylinder 56 is attached to the outer periphery of the projecting portion, as by adhesion. Accordingly, it is ensured that positive light shielding is effected by the light shielding cylinder 56.

In the above-described arrangement, if the movable case 32 is rotated through approximately 180 degrees from the exposure-light guiding position shown in FIG. 1 in the counterclockwise direction in FIG. 1, attachment and detachment of the diffuser box 28 are enabled by attachment and detachment of the magnetically attractable iron strip 48. If the negative film 16 having a different size is to be used, the diffuser box 28 can be replaced without the need to detach the movable case 32. Incidentally, the diffuser box 28 may be secured by press fitting the positioning projection 50 into the recess 52 so that the diffuser box 28 can be attached and detached by pushing operation in the direction of the arrow A of FIG. 3 and pulling operation in the direction of the arrow B of FIG. 3, respectively.

Accordingly, unlike the conventional apparatus, it is unnecessary to prepare a multiplicity of cases for accommodating various kinds of diffuser boxes and, therefore, the cost can be reduced.

Formation of an image to be printed on the photographic paper 20 is effected by passing light emitted from the light source 24 through the filter 26, diffusing the light in the diffuser box 2, irradiating the negative film 16 with the light diffused, and exposing the photographic paper 20 through the lens unit 18.

As described above, in accordance with the present invention, in the photographic printing apparatus which is arranged to diffuse light emitted from the light source and irradiate a negative film with the light diffused, the diffuser box is detachably disposed in the case, and the case is swingable between the exposure-light guiding position and the out-of-optical-path position. Accordingly, the present invention provides an excellent effect in that there is no need to prepare a multiplicity of cases for accommodating a diffuser box.

This invention may be practiced or embodied in still other ways without departing from the spirit or essential character thereof. The preferred embodiments described herein are therefore illustrative and not restrictive, the scope of the invention being indicate by the appended claims and all variations which come within the meaning of the claims are intended to be embraced therein.

What is claimed is:

1. A photographic printing apparatus arranged to diffuse light emitted from a light source and irradiate a negative film with said light diffused, for printing an image from said negative film, comprising:
   means for accommodating said light source;
   means for diffusing light emitted from said light source, said diffusing means being swingable with respect to said accommodating means; and
   mounting means for mounting detachably said diffusing means in said mounting means and for being swingable between an exposure-light guiding position and an out-of-optical-path position, said mounting means being swingably attached to said accommodating means.

2. A photographic printing apparatus according to claim 1, further comprising means for swingably connecting said accommodating means to said mounting means.

3. A photographic printing apparatus according to claim 2, further comprising means for detachably holding said accommodating means and said mounting means said means for detachably holding being disposed between said accommodating means and said mounting means.

4. A photographic printing apparatus according to claim 3, wherein said diffusing means and said mounting means respectively include means for preventing their positions from shifting with respect to each other.

5. A photographic printing apparatus according to claim 4, wherein said diffusing means has a projecting portion which partially projects from said mounting means to a side downstream of said optical path, means for positively keeping light from said light source which is attached to the outer periphery of said projecting portion.

6. A photographic printing apparatus according to claim 5, further comprising means disposed in said accommodating means for filtering light emitted from said light source.

7. A photographic printing apparatus arranged to diffuse light emitted from a light source and irradiate a negative film with said light diffused, for printing an image from said negative film, comprising:
   a body for accommodating said light source;
   a movable body attached to said accommodating body for being swingable between an exposure-light guiding position and an out-of-optical-path position, and
   a diffuser box detachably mounted in said movable body for diffusing said light emitted from said light source.

8. A photographic printing apparatus according to claim 7, further comprising a connecting member for swingably connecting said accommodating body to said movable element.

9. A photographic printing apparatus according to claim 8, further comprising holding means removably provided between said accommodating body and said movable body for holding detachably thereof, and said holding means separatably connecting said diffuser box to said movable body.

10. A photographic printing apparatus according to claim 9, wherein said diffuser box and said movable body respectively include positioning devices for preventing their positions from shifting with respect to each other.

11. A photographic printing apparatus according to claim 10, wherein said diffuser box has a projecting portion which partially projects from said movable body to a side downstream of said optical path, a light shielding cylinder for positively keeping light from said light source which is attached to the outer periphery of said projecting portion.

12. A photographic printing apparatus according to claim 11, further comprising a filter member disposed in said accommodating body for filtering light emitted from said light source.

13. A photographic printing apparatus arranged to diffuse light emitted from a light source and irradiate a negative film with said light diffused, for printing an image from said negative film, comprising:
- a fixed case for accommodating said light source;
- a filter member disposed in said fixed case for passing said light emitted from said light source;
- a movable case attached to said fixed case for swinging motion between an exposure-light guiding position and an out-of-optical-path position;
- a diffuser box detachably mounted in said movable case for diffusing said light emitted from said light source;
- a negative film carrier for carrying said negative film, said negative film carrier being located close to said movable case; and
- a lens unit located on an optical path which extends from an outlet of said diffuser box through said negative film carrier.

14. A photographic printing apparatus according to claim 13, further comprising a hinge member for swingably connecting said fixed case to said movable case.

15. A photographic printing apparatus according to claim 14, further comprising an attracting element and an attractable element which cooperate with each other to detachably hold said fixed case and said movable case, said attracting element being provided on one of the side of said fixed case which is downstream of its optical path and the side of said movable case which is upstream of its optical path, while said attractable element is provided on the other side, the one of said attracting element and said attractable element which is provided on said movable case being detachable so as to allow said diffuser box to be attached to and detached from said movable case.

16. A photographic printing apparatus according to claim 15, wherein said diffuser box includes one of a recess and a positioning projection, while said movable case includes the other, so that the positions of said diffuser box and said movable case are prevented from shifting with respect to each other.

17. A photographic printing apparatus according to claim 16, wherein said diffuser box has a projecting portion which partially projects from said movable case to a side downstream of said optical path, a light shielding cylinder for positively keeping light from said light source being attached to the outer periphery of said projecting portion.

18. A photographic printing apparatus according to claim 17, wherein said diffuser box is made of foamed polystyrol.

* * * * *